Sept. 6, 1960 M. E. FRY 2,951,435
DOMESTIC APPLIANCE
Filed April 22, 1957 3 Sheets-Sheet 1

INVENTOR.
Millard E. Fry
BY
His Attorney

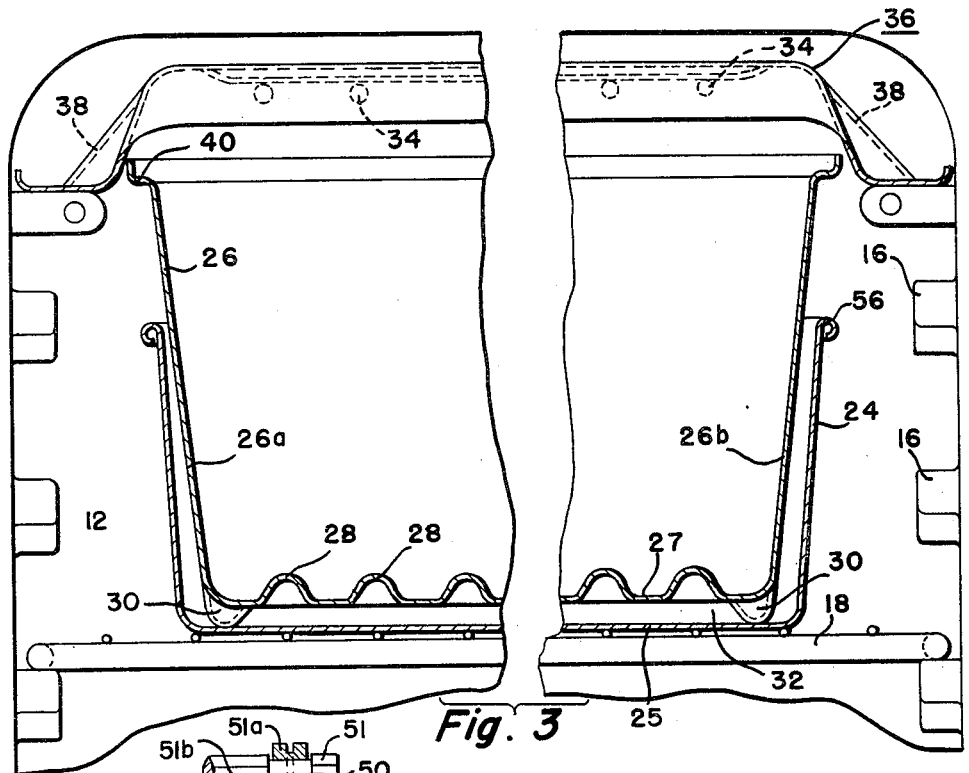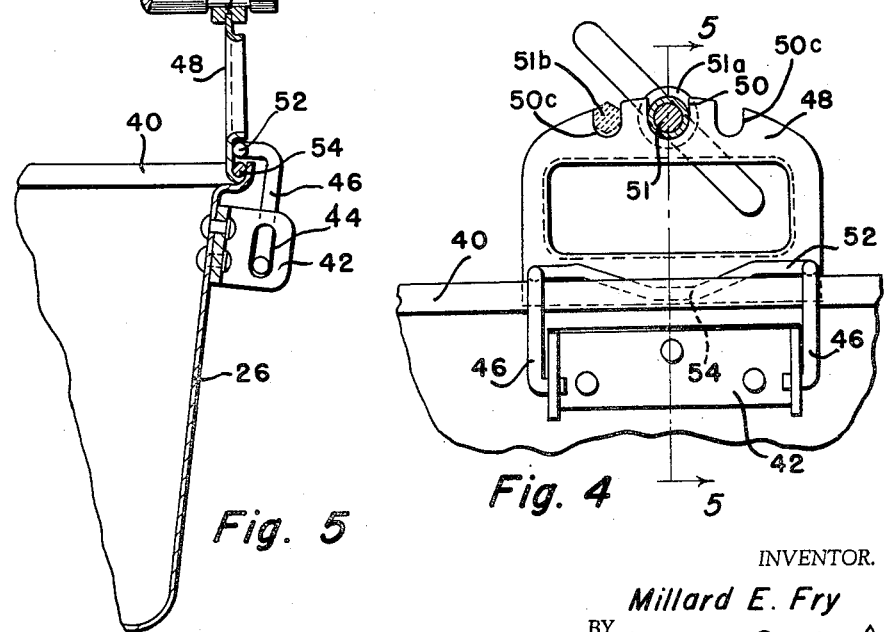

Sept. 6, 1960 M. E. FRY 2,951,435
DOMESTIC APPLIANCE
Filed April 22, 1957 3 Sheets-Sheet 3

INVENTOR.
Millard E. Fry
BY Edwin S. Dyking
His Attorney

United States Patent Office 2,951,435
Patented Sept. 6, 1960

2,951,435
DOMESTIC APPLIANCE
Millard E. Fry, Dayton, Ohio, assignor to General Motors Corporation, Detroit, Mich., a corporation of Delaware Filed Apr. 22, 1957, Ser. No. 654,221
4 Claims. (Cl. 99—340)

This invention relates to a domestic appliance and more particularly to electrical broiling apparatus for ovens and the like.

One of the problems encountered in broiling with present-day food broiling apparatus is the problem of preventing grease and the like from spattering out of the broiling pan against the walls of the enclosure in which the broiling operation is taking place. Where spatter is not prevented, the walls of the broiling compartment soon become covered with a deposit of grease or the like that burns onto the walls. This deposit can only be removed at the expense of a great deal of effort by the user.

It is accordingly an object of this invention to provide broiling apparatus which prevents spatter against the walls of the oven or compartment wherein the broiling is taking place. The broiling apparatus conveniently includes an open top, high sided broiler pan that is located within an oven or compartment immediately below a broiling heating element that is disposed near the top of the oven and which is partially enclosed by a reflector member. The top edge of the broiling pan extends above the lower edge of the reflector and with this arrangement the side walls of the broiling pan and the reflector jointly provide a barrier for grease spatter that would otherwise find its way to the sidewalls of the oven.

Another object of this invention is to provide broiling apparatus including a high sided broiler pan and a second pan, the two pans being nested one within the other and one of the pans having a liquid tight container portion adapted to contain a quantity of water or other cooling liquid for cooling the high sided pan.

Still another object is to provide a broiling pan with handles that are pivoted thereto, the handles including rotisserie spit supporting notches and including means for engaging the pan to hold the handles in a vertical rotisserie spit supporting position.

Further objects and advantages of the present invention will be apparent from the following description, reference being had to the accompanying drawings, wherein a preferred form of the present invention is clearly shown.

In the drawings:

Figure 3 is a front view, partly in section, showing the location of the broiler pan assembly of Figure 2 in the oven of Figure 1;

Figure 4 is a plan view of a combined handle and rotisserie support made in accordance with this invention;

Figure 5 is a vertical sectional view taken along line 5—5 of Figure 4;

Figure 1:
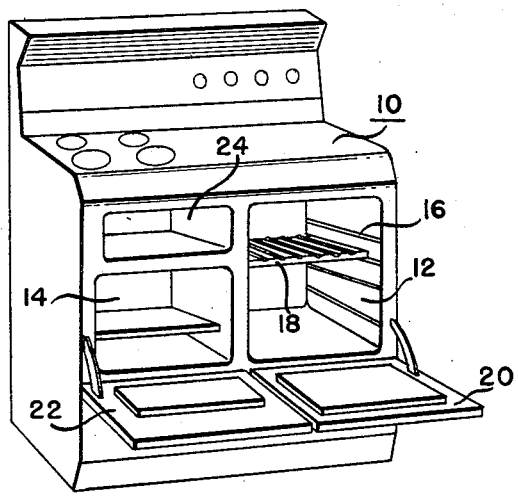
Figure 1 is a perspective view of an electric range that is adapted to contain the broiling apparatus of this invention.

Referring now to the drawings and more particularly to Fig. 1, an electric range generally denoted by reference numeral 10, has a pair of oven compartments 12 and 14. The oven 12 is of greater height than oven 14 and is formed with a plurality of shelf supports 16 that support a shelf 18 formed of wire rod material. A door 20 is pivoted to the range 10 and is adapted to close the front access opening of oven 12. The oven 14 is closed by a door 22 that is pivoted to the range and which also closes a compartment 24 that is adapted to contain the broiler pan assembly of this invention when the assembly is not being used.

Figure 2:
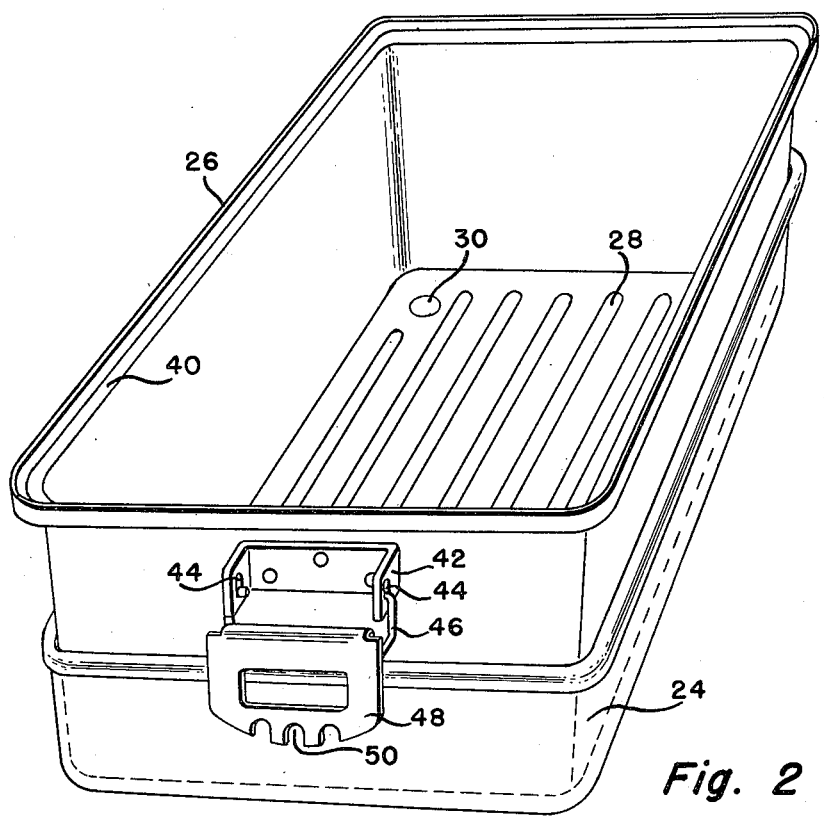
Figure 2 is a perspective view of a broiler pan assembly made in accordance with this invention.

The broiler pan assembly of this invention, as more particularly shown in Figs. 2 and 3, comprises an outer open top pan 24 and an inner high sided pan 26 that is nested within the pan 24. Both pans are made of aluminum and pan 26 is made approximately 5 to 6 inches in height. The high sided pan 26 is provided with a plurality of transverse ribs 28 that form a rack or grid for the food load to be cooked, the bottoms of the ribs serving to collect renderings during the broiling operation. The pan 26 is also formed with struck-away or bumped portions 30 adjacent each corner thereof. The struck-away portions 30 space the bottom wall 27 of the pan 26 away from the bottom wall 25 of pan 24 when the pan 26 is nested within the pan 24. The space 32 between the bottom walls of pans 24 and 26 is filled with water prior to a broiling operation to effectively cool the sidewalls 26a and 26b of the broiler pan 26.

The operative position for the broiler pan assembly is illustrated in Fig. 3 wherein the lower pan 24 rests on shelf 18 which, in turn, is supported by shelf supports 16. The oven 12 is provided with an electric heating element 34 that is located within a reflector member generally denoted by reference numeral 36. The reflector element is generally dish-shaped, having sidewalls 38 that extend substantially from the front of the oven to the back of the oven. The top flanged edge 40 of broiler pan 26 extends above the lower edge of walls 38, as is clearly shown in Fig. 3. With this arrangement the food load to be cooked, which is placed on ribs 28, is located substantially below the top edge of broiler pan 26. Since the top edge of broiler pan 26 extends above the lower edge of reflector walls 38, the reflector and sidewalls of the broiler pan provide a barrier for the escape of grease and the like which otherwise would spatter against the sidewalls of oven 12. Moreover, since the sidewalls of the broiler pan 26 are cooled by water in space 32, the spatter against these walls will ordinarily not burn thereon, so that the broiler pan 26 may be readily cleaned after the broiling operation has been completed.

The broiler pan 26 is provided with brackets 42 at opposite ends thereof. Each bracket is formed with vertically extending slots 44 which receive wire rod members 46. The wire rod members are welded or otherwise secured to handles 48 which are each formed with notches 50 and 50c. The wire rods 46 are interconnected by a rod 52 that has a downwardly extending portion 54. The handle 48 is thus pivoted to the bracket 42 and the rods 46 may also move upwardly and downwardly in slots 44. The notches 50 are wider than notches 50c and serve to support a rotisserie spit 51 that is placed within notches 50, the rotisserie spit being supported by the identical handles 48 located at opposite ends of broiler pan 26. The rotisserie spit carries a pair of spool or pulley-shaped bearing members 51a at opposite ends thereof that fit into notches 50. The remainder of the spit is preferably hexagonal in cross section along its length.

If it is desired to fix the spit 51 from rotation to work on the food load carried by the spit, the hexagonal portions of the spit are placed in either notch 50c in a position indicated by the dotted lines in Fig. 4, the spit then being supported against rotation by oppositely disposed handles 48. In this position the flat sides of hexagonal spit 51 rest against the sides of a notch 50c to preclude rotation of the spit. The rear wall of oven 12 is preferably provided with rotisserie spit driving mechanism (not shown) of the type disclosed in copending application S.N. 505,602, filed May 4, 1955, now Patent No. 2,878,276, issued March 17, 1959, for at times rotatably driving spit 51. The handles 48 are held in a vertical rotisserie spit supporting position by the engagement of rod portions 54 within the flanged portion 40 of the broiler pan, as more particularly illustrated in Figs. 4 and 5. To set the handles in their vertical rigid position, it is only necessary to pull the handles up slightly and then slide the rod portion 54 down into the flanged portion 40. When the pan 26 is used for supporting a rotisserie spit the pan rests directly on shelf 18 with the bumps 30 lying between the wire rods of the shelf. The shelf 18 would, of course, be moved to a lower position on shelf guides 16 when the rotisserie is operating to provide sufficient space between pan 26 and heating element 34.

It should be noted that the lower pan 24 of the broiler pan assembly is provided with a rolled edge 56 which interfits in the flanged portion 40 of the high sided broiler pan 26. The broiler pan may then be used as a roaster, with the pan 24 functioning as the cover for the roaster. In such an arrangement the pan 24 is merely inverted and fitted to the pan 26 with the rolled edge 56 fitting exactly in the flanged portion 40 of broiler pan 26.

Figure 6:
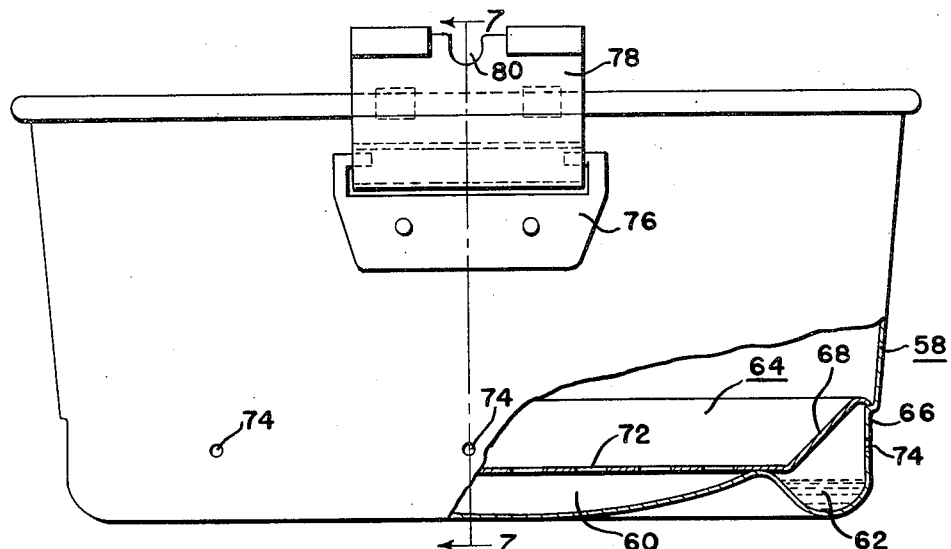
Figure 6 is an end view, with parts broken away, of a modified broiler pan made in accordance with this invention.
Figure 7:
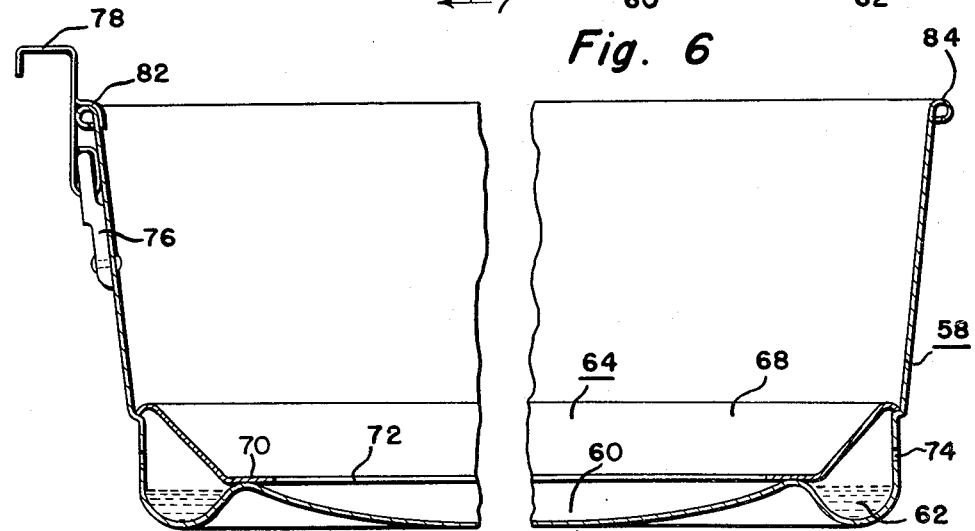
Figure 7 is a vertical sectional view taken along line 7—7 of Figure 6.
Figure 8:
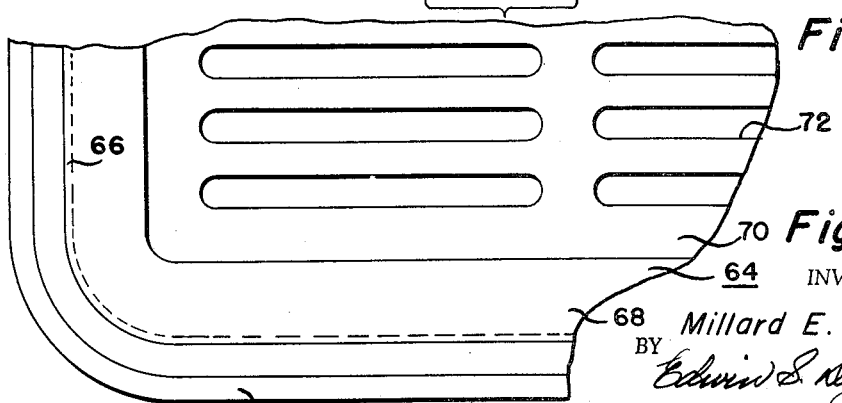
Figure 8 is a fragmentary top plan view of the broiler pan assembly shown in Figures 6 and 7.

A modified broiler pan assembly is illustrated in Figs. 6, 7 and 8. This assembly includes a high sided pan generally designated by reference numeral 58, that preferably is of the same height as that of broiler pan 26. The bottom wall of pan 58 is shaped to form a central sump or cavity 60 that is bounded by a peripheral trough 62. A cover plate member or inner pan generally designated by reference numeral 64 covers the bottom of broiler pan 58 and has a peripheral edge abutting a ledge portion 66 formed integral with the broiler pan 58. The cover member 64 has an imperforate wall portion 68 that entirely covers the trough 62 and has a central portion 70 formed with passages 72. The central portion 70 and passages 72 overlie the sump or cavity 60, as is clearly shown in Figs. 6 and 7. The sidewalls of broiler pan 58 are provided with passages 74 that connect the trough 62 with the exterior of the broiler pan. In the arrangement just described, the trough 62 contains a quantity of cooling water which cools the sidewalls of broiler pan 58. The passages 74 provide a means for relieving any steam trapped between wall 68 of cover member 64 and the broiler pan.

In the arrangement of Figs. 6, 7 and 8 the food load to be cooked is placed on the central portion 70 of cover member 64 and grease and the like evolved during the broiling operation pass through the passages 72 into the sump or cavity 60. The broiling pan of Figs. 6, 7 and 8 may be disposed in a position identical with the broiling pans 24 and 26 of Fig. 3 during the broiling operation, with the top edge of broiling pan 58 extending above the lower edge of reflector 38.

The broiling pan 58 is also provided with a supporting arrangement for a rotisserie spit. To this end brackets 76 are secured to opposite ends of broiling pan 58. The brackets support handles 78 which are each formed with a spit supporting notch 80. The handles 78 are provided with lug members 82 that engage over the top rolled edge 84 of broiling pan 58 when it is desired to place and hold the handles 78 in a vertical rotisserie spit supporting position.

Several advantages accrue from the use of the broiler pan arrangement hereinbefore described. As already noted, the broiler pan effectively precludes spatter of the sidewalls of the oven in which it is used. The broiler pan also exhibits greater broiling efficiency due to the fact that it is high sided and because it is made of aluminum. The radiant heat from heating element 34 is reflected onto the food load by the aluminum high sided pan 26, thus increasing the broiling efficiency.

At least one other advantage appears from the use of a high sided broiler pan and by placing the upper edge of the broiler pan above the lower edge of the heating element reflector. In many electrically heated ovens the sensing element for the thermostat that controls the oven heating elements is placed in the oven in such a position that heat radiation from the electric heating element of the oven may prematurely trip open the thermostat during a broiling operation. This effect is precluded by the use of the high sided broiler pan and heating element reflector which trap the radiated heat within the confines of the broiler pan and reflector. This trapping of the heat also provided for greater broiling efficiency.

While the form of embodiment of the invention as herein disclosed constitutes a preferred form, it is to be understood that other forms might be adopted, as may come within the scope of the claims which follow.

What is claimed is as follows:

1. In combination with an oven, an electric heating element in said oven located adjacent the top thereof, an inverted generally dish shaped reflector element partially enclosing said heating element, said reflector element having a sidewall, support means located within said oven, a first open top liquid-tight pan resting on said support means, and a second open top pan in said first pan located immediately below said heating element and formed of reflective material, means spacing the bottoms of said pans from one another, said second pan being higher than said first pan and having its upper edge located above and within the lower edge of said reflector member and said upper edge spaced laterally from said sidewall to form a passageway for facilitating communication between the interior of said second pan and said oven, and said second pan having its bottom wall formed with a plurality of ribs, said first pan being adapted to contain a quantity of water for cooling said second pan.

2. In combination with an oven, an electric heating element in said oven located adjacent the top thereof, an inverted generally dish shaped reflector element partially enclosing said heating element, support means located within said oven, a relatively high sided open top broiler pan resting on said support means immediately below said heating element, the top edge of said broiler pan being located above the lower edge of said reflector element and the bottom of said broiler pan being formed within a central cavity bounded by a peripheral trough, and a cover member for the bottom of said broiler pan fitting within said broiler pan and entirely covering said trough, said cover member being perforated over the area covering said central cavity, said trough being adapted to contain cooling water for cooling said broiler pan and said cavity being adapted to collect grease and the like during a broiling operation.

3. The structure set forth in claim 2 wherein the broiler pan is formed with a plurality of relief passages connecting the trough with the exterior of the pan.

4. In combination with an oven, an electric heating element in said oven located adjacent the top thereof, an inverted generally dish shaped reflector element partially enclosing said heating element, support means located within said oven, a first open top pan resting on said support means, and a second open top pan in said first pan located immediately below said heating element, means spacing the bottoms of said pans from one another, said second pan being higher than said first pan and having its upper edge located above the lower edge of said reflector member and having its bottom wall formed with a plurality of ribs, said first pan being adapted to contain a quantity of water for cooling said second pan, and wherein said second pan is provided with handles at opposite ends thereof and which are pivoted to the pan, the handles each having a rotisserie spit supporting notch and including means for holding the handles in a vertical position.

References Cited in the file of this patent

UNITED STATES PATENTS

| Number | Name | Date |
|---|---|---|
| 77,349 | Bigelow | Apr. 28, 1868 |
| 604,252 | Lockstone | May 17, 1898 |
| 652,660 | Bradlee | June 26, 1900 |
| 693,725 | Leland | Feb. 18, 1902 |
| 1,263,359 | Armstrong | Apr. 23, 1918 |
| 2,042,993 | Hopes | June 2, 1936 |
| 2,229,518 | Parker | Jan. 21, 1941 |
| 2,242,328 | Russel et al. | May 20, 1941 |
| 2,262,910 | Aller | Nov. 18, 1941 |
| 2,300,837 | Ames | Nov. 3, 1942 |
| 2,467,480 | Hudson | Apr. 19, 1949 |
| 2,477,529 | Sprinkle et al. | July 26, 1949 |
| 2,477,546 | Reeves | July 26, 1949 |
| 2,521,220 | Huntington | Sept. 5, 1950 |
| 2,580,549 | Jacobson | Jan. 1, 1952 |
| 2,634,674 | Irwin | Apr. 14, 1953 |
| 2,641,177 | Finizie | June 9, 1953 |